Figure 1:
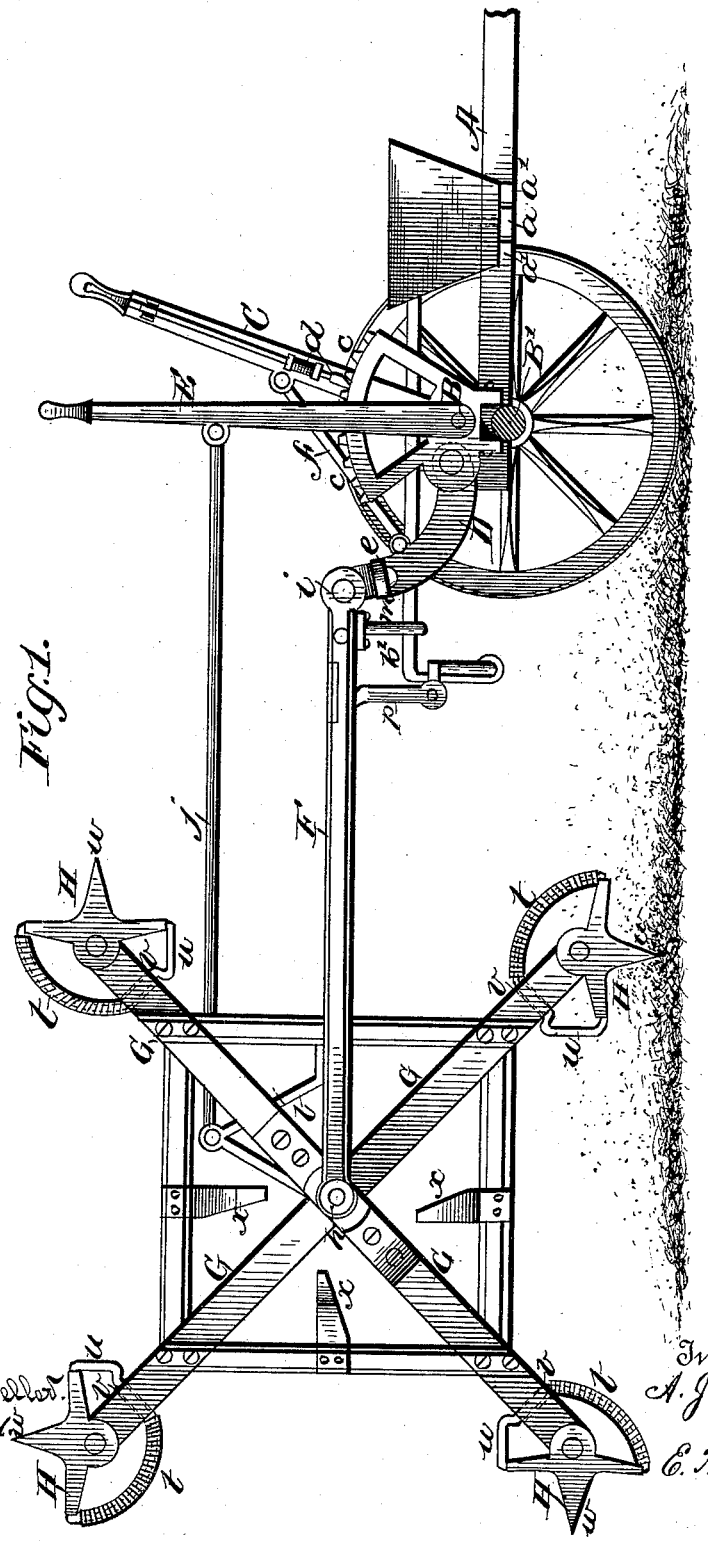

(No Model.) 4 Sheets—Sheet 1.

A. J. THOMPSON.
CHECK ROWER.

No. 387,270. Patented Aug. 7, 1888.

Witnesses
Fred Heller
H. J. Englands

Inventor
A. J. Thompson
by E. H. Gelston
Attorney.

(No Model.) 4 Sheets—Sheet 2.
A. J. THOMPSON.
CHECK ROWER.
No. 387,270. Patented Aug. 7, 1888.
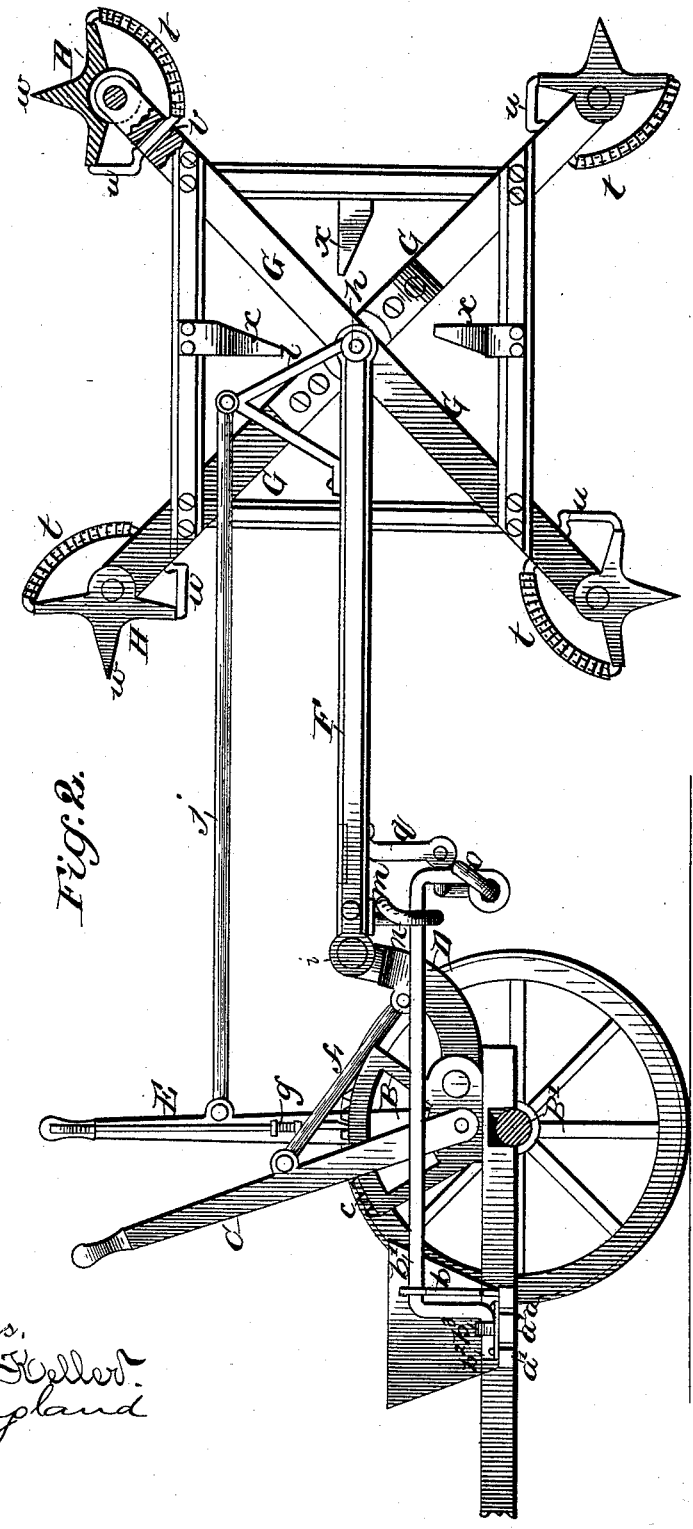

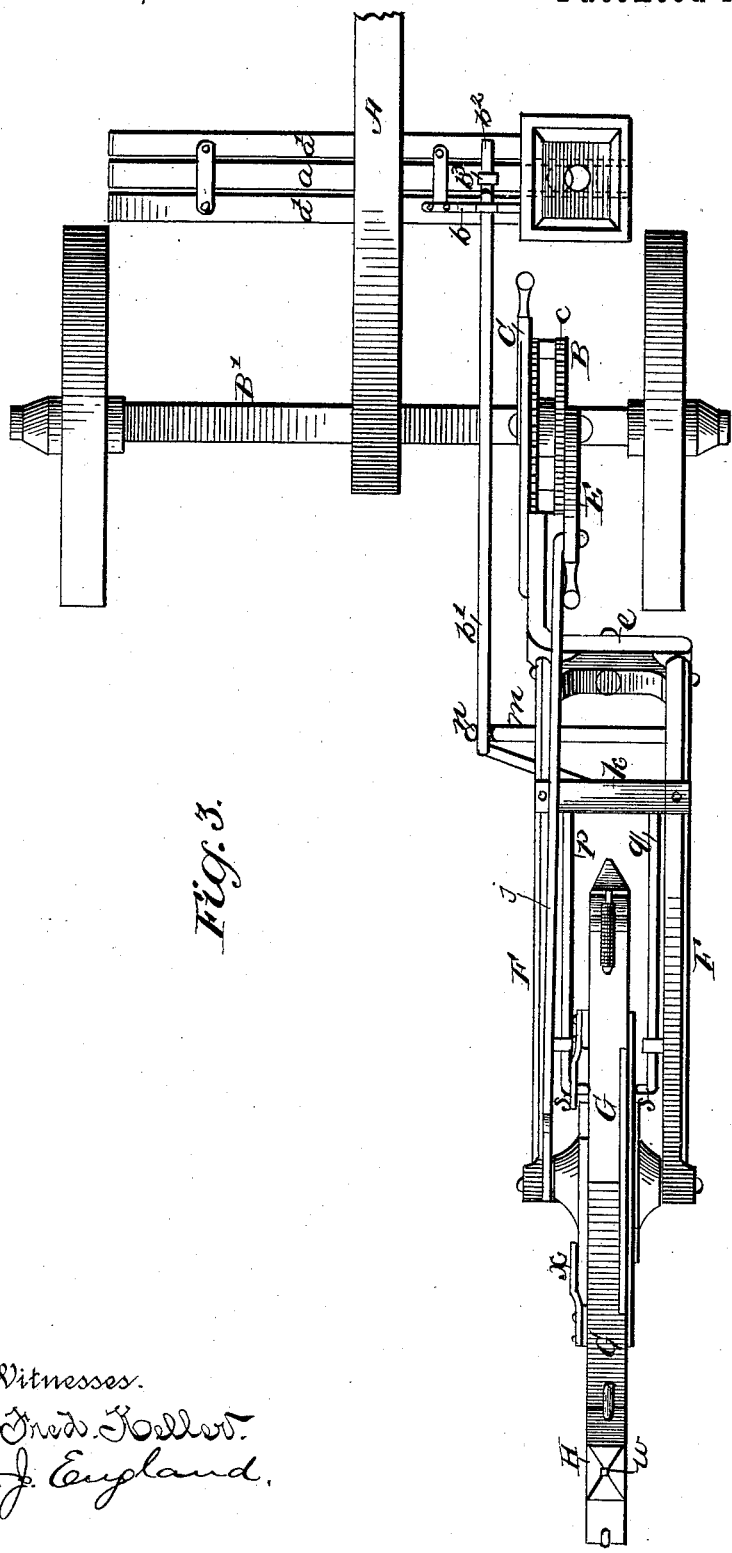

(No Model.) 4 Sheets—Sheet 4.
A. J. THOMPSON.
CHECK ROWER.
No. 387,270. Patented Aug. 7, 1888.
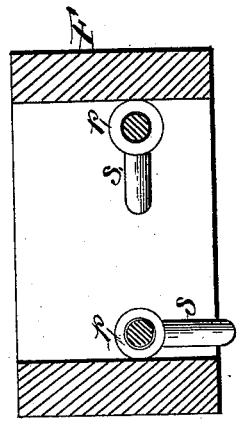
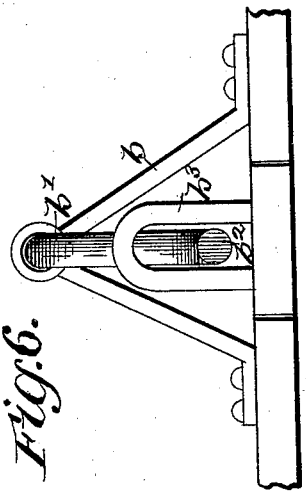
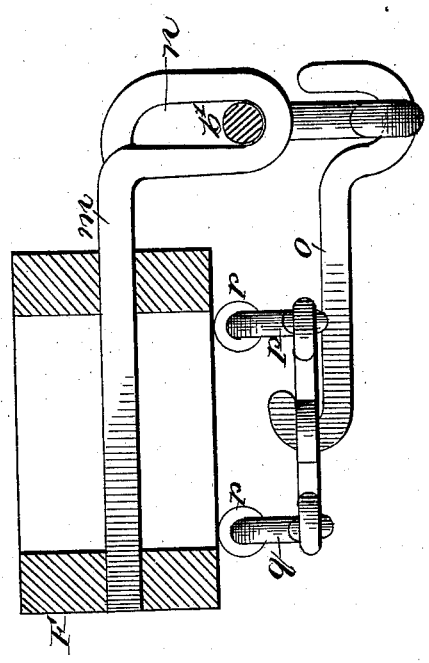
Witnesses,
C. Fred Heller
H. J. England
Inventor.
A. J. Thompson,
by
E. N. Gelston,
Attorney.

UNITED STATES PATENT OFFICE.

ALFRED J. THOMPSON, OF FAIR GRANGE, ILLINOIS.

CHECK-ROWER.

SPECIFICATION forming part of Letters Patent No. 387,270, dated August 7, 1888.

Application filed October 10, 1887. Serial No. 251,901. (No model.)

*To all whom it may concern:*

Be it known that I, ALFRED J. THOMPSON, a citizen of the United States of America, residing at Fair Grange, in the county of Coles and State of Illinois, have invented certain new and useful Improvements in Check-Rowers, of which the following is a specification, reference being had therein to the accompanying drawings.
My invention relates to certain new and useful improvements in check-rowers; and it consists in cross-arms having yielding checks at their outer ends and revolving within a frame, an elevating attachment connecting with said frame, moving mechanism connecting with a seed-slide mounted on a frame with wheels, the objects of my invention being to check the corn-rows at equal distance apart and cover the seed by revolving arms in rear of a seeding-machine, to elevate or depress the same at the will of the operator, and, further, to operate the seed-slide of a seeder by mechanism connected with said revolving arms. I attain these objects by means of the peculiar arrangement and construction of the various parts of my device, which will be more fully pointed out and described in the specification and claims, reference being had to the drawings accompanying this application and forming part of the same, in which—

Figure 1 is a side elevation of my invention. Fig. 2 is a side elevation taken opposite to the view in Fig. 1. Fig. 3 is a top plan view; and Figs. 4, 5, and 6 are detail views.
Similar letters refer to like parts throughout the drawings.

Referring to the drawings, A represents the frame of a seeding-machine having a cross seed-slide, $a$, adapted to move under seed-boxes or feeding-hoppers and provided with end perforations to permit the seed to drop. Said seed-slide $a$ is formed to move horizontally between two parallel cross-pieces, $a'$, to one of which is secured a vertical standard, $b$, having a perforation in its upper end to admit and loosely hold a connecting-rod, $b'$. The forward end of said rod is bent to form a crank-arm, $b^2$, which extends into the slot of the vertical standard $b^3$, which is secured to seed-slide $a$. A curved metal frame, B, is secured to axle B' of frame A and extends upward, its upper edge forming a segment of a circle and provided with notches $c$. A vertical lever, C, is pivoted at its inner end to the lower part of frame B, and its inner face is provided with a spring catch or pawl, $d$, adapted to engage notches $c$ and hold said lever in place. A curved metal support-piece, D, is pivoted at one end to the lower rear portion of frame B, and the opposite end is bent upward and outward to form a flat bearing-surface, $e$. Said support-piece D is joined to lever C by connecting-rod $f$. By this construction said piece D is raised or depressed at the will of the operator and held at the desired inclination. A lever, E, opposite lever C is pivoted in like manner to frame B, and is provided with a spring-catch, $g$, adapted to fit into notches $c$.

F are horizontal side bars extending rearwardly, their rear ends perforated to receive the ends of axle $h$, and the opposite ends are journaled on a cross-roller, $i$, and a short distance in rear of said roller a cross-piece, $k$, joins said side bars. Cross-roller $i$ is centrally joined to projection $e$, which permits of a horizontal circular movement of side arms, F, and the cross-roller $i$ permits of a vertical movement of said side arms. A rod, $j$, connects lever E with bracket $l$, which is secured to one of the side bars, F, and by means of this lever and rod the side bars, F, are raised or depressed, as desired.

A guide-bracket, M, is secured to the outer face of one of the side bars, and is formed with a loop, $n$, through which extends rod $b'$, and the rear end of said rod is bent downward and joined to a cross-rod, $o$, which is secured to the lower ends of rods $p\ q$. Said rods $p\ q$ are bent horizontally and extend along the inside faces of side bars, F, and may be loosely held by staples. The rear ends of rods $p\ q$ are bent inward at right angles and terminate in short projections $s$.

Axle $h$ is secured centrally to projecting arms G, which are of equal length and cross each other at right angles. Their outer ends are provided with pivoted checks or feet H. One horizontal arm of each foot is secured to one end of a curved rod, $u$. The opposite end of said rod passes through a slot, $v$, in each arm and through each coiled spring and connected to the opposite horizontal arm of each foot, one end of springs $v$ resting against said arms and the opposite end against the arms G, whereby, when said arms G revolve, the central points, $w$, of the feet enter the ground. The horizontal arms press the springs $v$ until the feet are released, when, by the revolution of arms G, the springs $v$ bring the feet back to their normal position. Said checks or feet have also a central projection, $w$, which in use extends into the ground, making an opening.

The arms G are connected by cross-bars H, which are secured by bolts at each end a short distance from the axle $h$ in the form of a square. Two of these cross-bars are secured on one side of arms G and two on the opposite side, and inward-projecting trips $x$ are attached centrally to each cross-bar on the outside. Said trips are cut inclined and are arranged to strike alternately against the rod projections $s$, by means of which rods $p$ and $q$ are alternately rotated downward, moving the cross-rod $o$ and rod $b'$ and the seed-slide $a$ in opposite directions, by means of which seed is dropped at intervals in line of the check-rower or arms G.

The operation of the device is obvious and needs no description.

Having thus described my invention, what I claim, and desire to secure by Letters Patent, is—

1. A check-rower attachment for planters, consisting of four projecting arms having end-pivoted feet provided with curved guide-rods surrounded by coiled springs, a frame joined to said arms and provided with inclined trip projections adapted to contact with the bent ends of operating-rods connected with seed-slides, in combination with side bars formed and pivoted to a metal frame, as shown, levers and connecting-rods for operating said bars and frame, substantially as shown and described.

2. A check-rower attachment for planters, consisting of revolving arms having pivoted feet, side bars journaled to the axle of said arms and carrying operating-rods connected with a bent rod that is in turn connected with the seed-slide of a seeder, cross-bars secured to said projecting arms and provided with trip projections adapted to contact with the bent ends of said operating-rods, substantially as shown and described.

In testimony whereof I affix my signature in presence of two witnesses.

ALFRED J. THOMPSON.

Witnesses:
WM. RICKETTS,
EDWARD SHARP.